Feb. 12, 1963   R. H. KATZENBERGER   3,077,123
TUNED FRICTION DAMPER
Filed April 24, 1961

INVENTOR.
RALPH H. KATZENBERGER
BY
Lockwood, Woodard, Smith & Weikart
Attorneys

3,077,123
TUNED FRICTION DAMPER

Ralph H. Katzenberger, Indianapolis, Ind., assignor to Schwitzer Corporation, Indianapolis, Ind., a corporation of Indiana
Filed Apr. 24, 1961, Ser. No. 105,195
9 Claims. (Cl. 74—574)

This invention relates generally to vibration dampers and in particular to torsional vibration dampers of the type wherein both dynamic friction between two relatively moving parts and the interval friction in an elastic element are utilized to provide a vibration damping effect.

An internal combustion engine crankshaft with a flywheel at one end forms a compound torsional pendulum, and vibrates as such. A simple torsional pendulum can be visualized as consisting of a steel rod rigidly held at its upper end and carrying at its lower end a rigid horizontal bar with weights at the bar ends. If horizontal forces, at right angles to the cross-bar, are applied to the weights, these will be angularly displaced from their normal position, the vertical rod being twisted or torsionally deflected. If the forces are then removed, the weights are carried back to their normal position by fiber stress in the vertical rod, and beyond the normal position somewhat because of their inertia. In this position the vertical rod is again under fiber stress, and the masses or weights will swing back again. Each succeeding swing will be of slightly less amplitude, however, because some of the energy originally stored in the system by the application of the horizontal forces is lost in overcoming air resistance and the resistance due to hysteresis in the rod, these last mentioned resistances being referred to as damping forces. After all the energy put into the system by the application of the horizontally applied force has been thus used up or dissipated, the pendulum comes to rest.

Torsional vibration may be of two kinds, forced and free. When a torsional pendulum such as that referred to above is deflected from its normal position and is then released as described above, it executes what are known as free vibrations. Each complete cycle of vibration occupies a definite time, known as the period of free vibration, regardless of whether the amplitude is large or small. The period, and hence the number of vibrations per minute, depends upon the moment of inertia of the swinging masses around the axis of oscillation and upon the torsional stiffness of the vertical rod. If, in distinction to the free vibration described above, the pendulum is dealt a rapid succession of blows, it is forced to vibrate at the rate of these impulses, and this is called forced vibration. It will be apparent that such forced vibrations occur constantly in internal combustion engine crankshafts, but usually their amplitudes are small, and they therefore cause little difficulty. The important case is that in which the rate of impulses is substantially equal to the natural rate of free vibration of the pendulum, in which case there is said to exist resonance. In ordinary free vibration the energy that originally started the vibration is gradually dissipated in overcoming the damping forces and the amplitude of the vibrations therefore decreases; when there is resonance, energy is added to the system during each cycle, and the amplitude of vibration constantly increases until finally a point is reached where the amount of energy required to overcome the damping forces (which increase with the amplitude) becomes equal to the amount of energy added per cycle by the impulses. If the damping forces are relatively small, the amplitude of vibration may continue to increase until the stress in the torsional member of the pendulum (the shaft) equals the ultimate strength of the material from which it is made and the torsional member will then fail by breakage.

In systems exhibiting torsional vibration such as the crankshaft of an internal combustion engine, it is conventional to provide dampers to control the vibration. There are primarily two types of dampers in use today, these being the frequency tuned type and the untuned type. The tuned dampers customarily utilize elastic materials which connect an inertia weight to a member which is locked for rotation with the shaft. These tuned dampers have the feature of reducing the vibration amplitudes due to the internal friction in the elastic element or elements. A further advantage of the tuned type is that the amplitude peaks of either of the two vibration modes encountered can be controlled to a certain extent by varying the natural frequency of the damper. The optimum condition normally occurs when the damper's natural frequency is slightly less than the basic engine frequency. The primary defect in conventional tuned dampers results from the fact that only a limited amount of friction or internal hysteresis can be built into the elastic materials without destroying their other necessary physical properties. The compromise which must be made in providing the elastic materials for conventional tuned dampers results in a friction value or internal hysteresis value for the elastic materials which is much lower than the optimum value.

In the untuned damper the designer can choose the amount of friction built into the unit without making the compromise referred to above. However, the total work done per unit of input amplitude is lessened by virtue of the fact that the inertia member amplitude will always be less than the input amplitude. One advantage of the present invention is that it provides the relatively unlimited choice of internal friction as well as providing the higher relative amplitudes inherent with the tuned assembly.

In the preferred embodiment of the present invention the damper hub is adapted for attachment to a rotating shaft subject to torsional vibration. The damper is further provided with a radially extending flange and an inertia member, having appreciable mass, is further provided, the inertia member having an internal, annular cavity into which the hub flange extends. Connection between the hub and the inertia member is provided by an elastic element, formed of a material such as synthetic rubber, which also acts as a tuning element for frequency control. Frictional material, which may take the form of movable inserts or a movable annular disc, are disposed in the cavity of the inertia member adjacent the hub flange. Means are provided for rotationally connecting the friction elements to the hub or to the inertia member. Spring means are also provided for holding the friction elements in intimate contact with the hub in the case where the friction members are mounted on the inertia member, and holding the friction members in intimate contact with the inertia member in the case where the friction members are mounted on or connected to the hub. The desired natural frequency for the damper to obtain the proper tuning effect may be achieved by varying the physical dimensions or the dynamic properties of the elastic material. The presence of separate friction members permits unlimited control of the internal friction of the damper.

The primary object of the present invention is to provide a tuned friction damper which combines the desirable characteristics of the conventional tuned and untuned types.

A further object of the present invention is to provide a tuned friction damper which has an internal friction greater than that of conventional tuned dampers, but which retains the ability to effectively control the natural frequency of the damper.

A further object of the present invention is to provide a tuned friction damper in which a relatively large amount of work will be done, and consequently a relatively large amount of energy absorbed in each vibrational cycle.

A further object of the present invention is to provide a tuned friction damper in which the magnitude of internal friction of the damper may be readily varied to provide the optimum magnitude for any particular application.

The full nature of the invention will be understood from the accompanying drawings and the following description and the claims.

Figure 1:
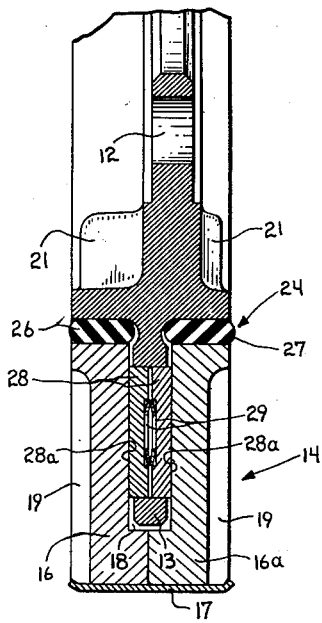
FIG. 1 is a side sectional view of a damper assembly embodying the present invention.
Figure 2:
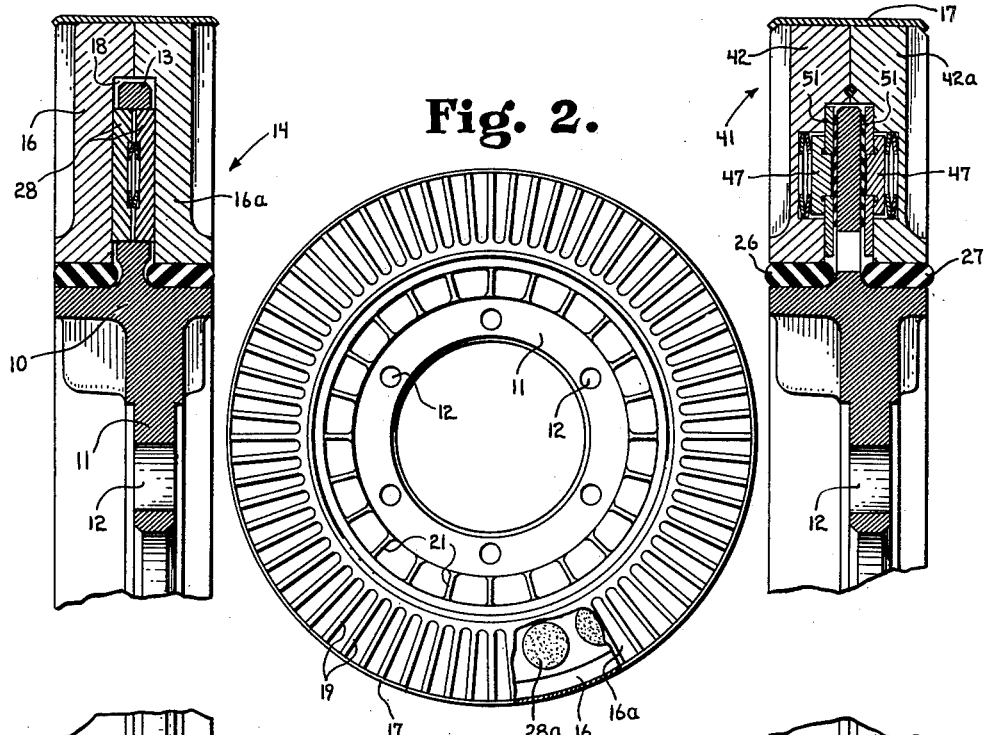
FIG. 2 is a front view, with a portion broken away of the damper assembly of FIG. 1.

Referring initially to FIGS. 1 and 2, the assembly embodying the present invention comprises a generally annular shaped driving member 10. The driving member has a radially inwardly extending portion 11 which is adapted to be mounted on a hub, accessory drive pulley, or similar means conventionally associated with the crankshaft of a reciprocating engine. The inwardly extending portion 11 may be provided with a plurality of apertures 12 to receive bolts for attaching the driving member to the crankshaft (not shown). The driving member 10 is further provided with a radially outwardly extending flange 13.

The driven inertia member, indicated generally at 14, is formed of two annular sections 16 and 16a which are held in assembled relation by means of a retaining band 17. Before assembly, the members 16 and 16a are machined to form a radially outwardly extending slot 18 which freely accommodates the radially extending flange 13 of the driving member. The exterior surfaces of the members 16 and 16a is formed to provide ribs or fins 19 which aid in the dissipation of heat from the assembly. The ribs 21 formed in the outer surfaces of the driving member 11 serve to reduce the mass to surface area ratio and facilitate the removal of heat from the assembly.

Interposed between the driven member 14 and the driving member 10 is an elastic means indicated generally at 24. The elastic means includes two annular elastic bands 26 and 27 which are arranged in side-by-side relation. The bands 26 and 27, confined between the driving and driven members, may be formed of rubber or a similar elastic composition and may be injected into the space between the driving and driven members either prior to or after curing. These bands may be in a state of radial compression in the assembly, and a suitable bonding agent may be applied between the elastic element and the driving and driven members depending upon the mode of manufacture used and the operational conditions. The material forming the elastic bands is selected so that it has physical properties which provide the desired natural frequency for the damper. The elastic means thus tunes the damper to the desired natural frequency.

The radially extending flange 13 of the driving member 10 is provided with a series of apertures slidably accommodating pairs of friction elements or discs 28. The inner adjacent surfaces of each pair of discs 28 is formed to provide a cavity housing resilient means in the form of adjacent Belleville washers 29. The resilience of the spring members 29 serves to urge the outer faces 28a of each of the discs into frictional engagement with the adjacent surfaces of the driven inertia member 14.

In operation, that is, in the application of a damper assembly to a specific rotating shaft subject to torsional vibrations, an example of such a shaft being an internal combustion engine crankshaft, the dynamic properties of the elastic means 24 and the inertial mass of the driven member 14 are chosen so that the natural frequency of the damper is slightly lower than the resonant frequency of the rotating shaft system to which the damper is attached. The ratio of damper frequency to shaft frequency will vary from application to application and the optimum will be dictated at least in part by the operating conditions of the shaft system. With the damper of the present invention installed on a rotating shaft such as an internal combustion engine crankshaft, as the frequency of the torque input to the shaft approaches the shaft's resonant frequency, the amplitude of the torsional vibrations induced will tend to increase. Since the natural frequency of the damper of the present invention is very nearly that of the shaft, the amplitude of vibrational, relative movement between the driving member 10 and the driven member 14 will also tend to increase. The amount of energy which can be dissipated in the damper depends on the work done by the damper. This work is the product of the frictional force resisting relative movement between the faces 28a and the adjacent surfaces of the members 16 and 16a and the distance through which relative motion of the driving member flange 13 occurs with relation to the driven member 14. Since the distance referred to is, in effect, the amplitude of vibrational movement between the driving and driven members, relatively large amount of energy will be dissipated in the damper since, as previously stated, the elastic means 24 tunes the damper assembly so that the vibrational amplitude between the driving and driven members is relatively large. While this vibrational amplitude is relatively large, since the natural frequency of the damper is somewhat lower than the natural frequency of the rotating shaft, destructive peak frequencies in the shaft are prevented. Stated differently, in accord with the rules for a simple torsional pendulum referred to above, the torsional vibration amplitude of the shaft itself will increase only until equilibrium is reached between the energy input to the shaft and the energy dissipated in the damper or shaft system due to miscellaneous sources of friction. In the damper, such source of friction is that resulting from the engagement of the friction elements 28 with the adjacent surfaces of the driven member 14. Since, as pointed out above, the energy dissipated in the damper of the present invention is relatively high, destructive or disturbing amplitudes of vibration in the shaft will thereby be limited to a relatively low and safe value.

Figure 3:
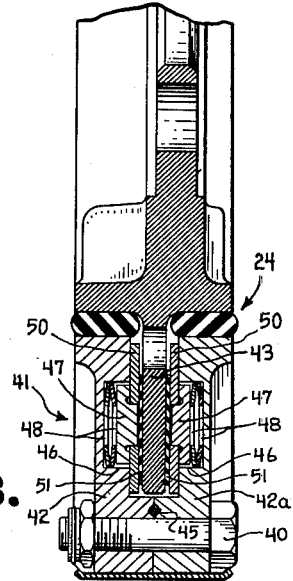
FIG. 3 is a side sectional view similar to FIG. 1 but illustrating a modified form of the present invention.

Referring now to FIG. 3 a modified form of the damper will now be described. This damper is similar in construction and identical in function to that of the damper shown in FIGS. 1 and 2. It differs primarily in that the damper is prelubricated and the friction members are carried by the driven member and engage the driving member flange rather than vice versa as is the case with the construction of FIGS. 1 and 2. In FIG. 3 parts which are identical with those of FIG. 1 are given the same reference numerals. The driven inertia member 41 is composed of two finned annular elements 42 and 42a which are joined by bolts 40 extending therethrough. The O-ring 45 provides a fluid tight seal. The outwardly extending flange 43 of the driving member extends freely into a cavity formed at the adjacent inner faces of the elements 42 and 42a. The elements 42 and 42a are further formed so as to provide opposed cavities 46 which accommodate spring pads or thrust members 47 and resilient means in the form of Belleville washers 48 which urge the pads outwardly from the cavities 46. The peripheral areas of the pads 47 engage annular locking plates 50 which are thereby urged into frictional engagement with the frictional facings 51 carried by the marginal area of the flange 43. The extension of the central portions of the pads 47 into apertures in the plates 50 serves to rotationally lock the plates 50 to the driven or inertia member. In this form of the invention the engagement of the frictional facings 51 and the spring biased annular plates 50 generate the frictional forces necessary to provide the desired damper characteristics as in the case of the damper described with reference to FIGS. 1 and 2. The operation of the damper of FIG. 3 is identical to that of FIG. 1 and the elastic means 24 serves its tuning function as described with reference to FIGS. 1 and 2.

From the foregoing it will be evident that the structure described provides a damper assembly which can be relatively simply manufactured and assembled. Since the friction faces in both the damper types of FIG. 1 and FIG. 3 are movable in an axial direction and since the spring means, in the form of the Belleville washers, may have a very low spring rate or force deflection ratio, relatively large tolerances in both machining and assembly may be utilized. The friction faces may be either dry or prelubricated. The amount of frictional force exerted may be varied by interchanging the spring making up the resilient means so as to give an optimum value for the frictional force in any particular installation or application. The elastic means can be compounded for resiliency only and thus used solely for tuning with the friction faces providing the desired frictional forces. It will be understood that the elastic means could also be compounded to contain the desired amount of internal friction or hysteresis and thus be utilized to aid the frictional facings in dissipating vibrational energy. The use of the spring biased friction faces minimizes the effect of wear on the assembly. The damper is further characterized by excellent heat transfer from the locus of energy conversion, that is away from the areas of frictional engagement.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:

1. A torsional vibration damper assembly for mounting in operative relation to the crankshaft of an internal combustion engine comprising a generally annular driving member having a radially inwardly extending surface for concentric attachment to a crankshaft and having a radially outwardly extending flange, a driven inertia member mounted concentrically of said driving member and having a central aperture therein accommodating said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially outwardly extending slot freely accommodating said outwardly extending flange of said driving member, and means for generating a frictional force resisting relative motion between said driving and driven members including a series a spaced friction elements carried by said ouwardly extending flange of said driving member, and resilient means urging said friction elements into frictional engagement with the driven element surfaces defining said radially outwardly extending slot, whereby torsional vibrations of the crankshaft are absorbed both by said elastic means and by said friction elements, said elastic means being so selected as to have physical properties insuring tuning of the damper to a natural frequency of the engine crankshaft system whereby the amplitude of vibrational motion between said driving and driven members is relatively large and the energy absorbed by said damper is correspondingly large.

2. A torsional vibration damper assembly for mounting in operative relation to the crankshaft of an internal combustion engine comprising a generally annular driving member adapted for concentric attachment to a crankshaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially outwardly extending slot freely accommodating said outwardly extending flange of said driving member, and means for generating a frictional force resisting relative motion between said driving and driven members including a series of spaced friction elements carried by said outwardly extending flange of said driving member, and resilient means urging said friction elements into frictional engagement with the driven element surfaces defining said radially outwardly extending slot, whereby torsional vibrations of the crankshaft are absorbed both by said elastic means and by said friction elements, said elastic means being so selected as to have physical properties insuring tuning of the damper to a natural frequency approaching the resonant frequency of the engine crankshaft system whereby the amplitude of vibrational motion between said driving and driven members is relatively large and the energy absorbed by said damper is correspondingly large.

3. A torsional vibration damper assembly for mounting in operative relation to the crankshaft of an internal combustion engine comprising a generally annular driving member adapted for concentric attachment to a crankshaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially extending surface adjacent said outwardly extending flange of said driving member, and means for generating a frictional force resisting relative motion between said driving and driven members including a series of spaced friction elements carried by said outwardly extending flange of said driving member, and resilient means urging said friction elements into frictional engagement with said radially extending surface of said driven element, whereby torsional vibrations of the crankshaft are absorbed both by said elastic means and by said friction elements, said elastic means being so selected as to have physical properties insuring tuning of the damper to a natural frequency approaching the resonant frequency of the engine crankshaft system whereby the amplitude of vibrational motion between said driving and driven members is relatively large and the energy absorbed by said damper is correspondingly large.

4. A torsional vibration damper assembly for mounting in operative relation to a shaft subject to torsional vibration comprising a generally annular driving member adapted for concentric attachment to a shaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially extending surface adjacent said outwardly extending flange of said driving member, and means for generating a frictional force resisting relative motion between said driving and driven members including a series of spaced friction elements carried by said outwardly extending flange of said driving member, and resilient means urging said friction elements into frictional engagement with said radially extending surface of said driven element, whereby torsional vibrations of the crankshaft are absorbed both by said elastic means and by said friction elements.

5. A torsional vibration damper assembly for mounting in operative relation to the crankshaft of an internal combustion engine comprising a generally annular driving member having a radially inwardly extending surface for concentric attachment to a crankshaft and having a radially outwardly extending flange, a driven inertia member mounted concentrically of said driving member and having a central aperture therein accommodating said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially outwardly extending slot freely accommodating said outwardly extending flange of said driving member, and means for generating a frictional force resisting relative motion between said driving and driven members including annular plates disposed within said slot between the adjacent surfaces of said driving member flange and said driven member, a series of spaced cavities formed in the driven member surfaces defining said slot, thrust members slidably accommodated within said cavities and extending into said annular plates to prevent relative rotation between said plates and said driven member, and resilient means urging said thrust members and consequently said annular plates into frictional engagement with said driving member flange, whereby torsional vibrations of the crankshaft are absorbed both by said elastic means and by said frictional force generating means, said elastic means being so selected as to have physical properties insuring tuning of the damper to a natural frequency approaching the resonant frequency of the engine crankshaft system whereby the amplitude of vibrational motion between said driving and driven members is relatively large and the energy absorbed by said damper is correspondingly large.

6. A torsional vibration damper assembly for mounting in operative relation to the crankshaft of an internal combustion engine comprising a generally annular driving member adapted for concentric attachment to a crankshaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear upon cyical displacement of said driven member with relation to said driving member, said driven member being provided with a radially outwardly extending slot freely accommodating said outwardly extending flange of said driving member, and means for generating a frictional force resisting relative motion between said driving and driven members including annular plates disposed within said slot between the adjacent surfaces of said driving member flange and said driven member, a series of spaced cavities formed in the driven member surfaces defining said slot, thrust members slidably accommodated within said cavities and extending into said annular plates to prevent relative rotation between said plates and said driven member, and resilient means urging said thrust members and consequently said annular plates into frictional engagement with said driving member flange, whereby torsional vibrations of the crankshaft are absorbed both by said elastic means and by said frictional force generating means, said elastic means being so selected as to have physical properties insuring tuning of the damper to a natural frequency approaching the resonant frequency of the engine crankshaft system whereby the amplitude of vibrational motion between said driving and driven members is relatively large and the energy absorbed by said damper is correspondingly large.

7. A torsional vibration damper assembly for mounting in operative relation to the crankshaft of an internal combustion engine comprising a generally annular driving member adapted for concentric attachment to a crankshaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear cyclical displacement of said driven member with relation to said driving member, said driven member being provided with a radially extending surface adjacent said outwardly extending flange of said driving member, and means for generating a frictional force resisting relative motion between said driving and driven members including an annular plate disposed between the adjacent surfaces of said driving member flange and said driven member, said annular plate being locked for rotation with said driven member and resiliently urged into frictional engagement with said driving member flange, whereby torsional vibrations of the crankshaft are absorbed both by said elastic means and by said frictional force generating means, said elastic means being so selected as to have physical properties insuring tuning of the damper to a natural frequency approaching the resonant frequency of the engine crankshaft system whereby the amplitude of vibrational motion between said driving and driven members is relatively large and the energy absorbed by said damper is correspondingly large.

8. A torsional vibration damper assembly for mounting in operative relation to a shaft subject to torsional vibration comprising a generally annular driving member adapted for concentric attachment to a shaft and having a radially outwardly extending flange, a driven inertia member mounted concentrically of said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially extending surface adjacent said outwardly extending flange of said driving member, and means for generating a frictional force resisting relative motion between said driving and driven members including an annular plate disposed between the adjacent surfaces of said driving member flange and said driven member, said annular plate being locked for rotation with said driven member and resiliently urged into frictional engagement with said driving member flange, whereby torsional vibrations of the shaft are absorbed both by said elastic means and by said friction elements.

9. A torsional vibration damper assembly for mounting in operative relation to a shaft subject to torsional vibration comprising a generally annular driving member adapted for concentric attachment to a shaft and having a radially outwardly extending surface, a driven inertia member mounted concentrically of said driving member, elastic means interposed between said driving and driven members prohibiting permanent displacement of the driven member with relation to the driving member and with said elastic means being stressed only in shear upon cyclical displacement of said driven member with relation to said driving member, said driven member being provided with a radially extending surface adjacent said outwardly extending surface of said driving member, and means for generating a frictional force resisting relative motion between said driving and driven members including an element locked for rotation with one of said extending surfaces and resiliently urged into frictional engagement with the other extending surface, whereby torsional vibrations of the shaft are absorbed both by said elastic means and by said frictional force generating means.

References Cited in the file of this patent

UNITED STATES PATENTS

| | | |
|---|---|---|
| 1,325,057 | Tibbetts | Dec. 16, 1919 |
| 1,950,888 | Tibbetts | Mar. 13, 1934 |
| 2,369,679 | Matteucci | Feb. 20, 1945 |

FOREIGN PATENTS

| | | |
|---|---|---|
| 365,832 | Great Britain | Jan. 28, 1932 |
| 876,921 | France | Aug. 24, 1942 |